US011119656B2

(12) United States Patent
Lee et al.

(10) Patent No.: US 11,119,656 B2
(45) Date of Patent: *Sep. 14, 2021

(54) REDUCING DATA DISTRIBUTION INEFFICIENCIES

(71) Applicant: PURE STORAGE, INC., Mountain View, CA (US)

(72) Inventors: Robert Lee, San Carlos, CA (US); Christopher Lumb, San Francisco, CA (US); Ethan L. Miller, Santa Cruz, CA (US); Igor Ostrovsky, Sunnyvale, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,482

(22) Filed: Jun. 10, 2019

(65) Prior Publication Data
US 2019/0294329 A1   Sep. 26, 2019

Related U.S. Application Data

(63) Continuation of application No. 15/339,302, filed on Oct. 31, 2016.

(51) Int. Cl.
G06F 12/00 (2006.01)
G06F 3/06 (2006.01)

(52) U.S. Cl.
CPC .............. *G06F 3/061* (2013.01); *G06F 3/067* (2013.01); *G06F 3/0608* (2013.01);
(Continued)

(58) Field of Classification Search
None
See application file for complete search history.

(56) References Cited

U.S. PATENT DOCUMENTS 5,208,813 A   5/1993 Stallmo
5,403,639 A   4/1995 Belsan
(Continued)

FOREIGN PATENT DOCUMENTS

CN   103370685 A   10/2013
CN   103370686 A   10/2013
(Continued)

OTHER PUBLICATIONS

Microsoft Corporation, "GCSettings.IsServerGC Property", Retrieved Oct. 27, 2013 via the WayBack Machine, 3 pages.
(Continued)

*Primary Examiner* — Jason W Blust
(74) *Attorney, Agent, or Firm* — Womble Bond Dickinson (US) LLP

(57) ABSTRACT

Systems and methods of deduplication aware scalable content placement am described. A method may include receiving data to be stored on one or more nodes of a storage array and calculating a plurality of hashes corresponding to the data. The method further includes determining a first subset of the plurality of hashes, determining a second subset of the plurality of hashes of the first subset, and generating a node candidate placement list. The method may further include sending the first subset to one or more nodes represented on the node candidate placement list and receiving, from the nodes represented on the node candidate placement list, characteristics corresponding to the nodes represented on the candidate placement list. The method may further include identifying one of the one or more nodes represented on the candidate placement list m view of the characteristic and sending the data to the identified node.

17 Claims, 8 Drawing Sheets

(52) U.S. Cl.
CPC .......... *G06F 3/0641* (2013.01); *G06F 3/0647* (2013.01); *G06F 3/0688* (2013.01); *G06F 3/0689* (2013.01)

(56) References Cited

U.S. PATENT DOCUMENTS

| | | |
|---|---|---|
| 5,940,838 A | 8/1999 | Schmuck et al. |
| 6,263,350 B1 | 7/2001 | Wollrath et al. |
| 6,286,056 B1 | 9/2001 | Edgar et al. |
| 6,412,045 B1 | 6/2002 | Dekoning et al. |
| 6,718,448 B1 | 4/2004 | Ofer |
| 6,757,769 B1 | 6/2004 | Ofer |
| 6,799,283 B1 | 9/2004 | Tamai et al. |
| 6,804,703 B1 | 10/2004 | Allen et al. |
| 6,834,298 B1 | 12/2004 | Singer et al. |
| 6,850,938 B1 | 2/2005 | Sadjadi |
| 6,915,434 B1 | 7/2005 | Kuroda |
| 6,954,881 B1 | 10/2005 | Flynn, Jr. et al. |
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,139,907 B2 | 11/2006 | Bakke et al. |
| 7,216,164 B1 | 5/2007 | Whitmore et al. |
| 7,272,674 B1 | 9/2007 | Nandi et al. |
| 7,313,636 B2 | 12/2007 | Qi |
| 7,577,802 B1 | 8/2009 | Parsons |
| 7,783,682 B1 | 8/2010 | Patterson |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,979,613 B2 | 7/2011 | Zohar et al. |
| 8,086,652 B1 | 12/2011 | Bisson et al. |
| 8,103,754 B1 | 1/2012 | Luong et al. |
| 8,117,464 B1 | 2/2012 | Kogelnik |
| 8,200,887 B2 | 6/2012 | Bennett |
| 8,205,065 B2 | 6/2012 | Matze |
| 8,301,811 B1 | 10/2012 | Wigmore et al. |
| 8,352,540 B2 | 1/2013 | Anglin et al. |
| 8,527,544 B1 | 9/2013 | Colgrove et al. |
| 8,560,747 B1 | 10/2013 | Tan et al. |
| 8,621,241 B1 | 12/2013 | Stephenson |
| 8,645,649 B2 | 2/2014 | Kaiya et al. |
| 8,700,875 B1 | 4/2014 | Barron et al. |
| 8,751,463 B1 | 6/2014 | Chamness |
| 8,806,160 B2 | 8/2014 | Colgrove et al. |
| 8,874,850 B1 | 10/2014 | Goodson et al. |
| 8,959,305 B1 | 2/2015 | Lecrone et al. |
| 9,063,937 B2 | 6/2015 | McDowell et al. |
| 9,081,713 B1 | 7/2015 | Bennett |
| 9,189,334 B2 | 11/2015 | Bennett |
| 9,294,567 B2 | 3/2016 | Hussain et al. |
| 9,311,182 B2 | 4/2016 | Bennett |
| 9,423,967 B2 | 8/2016 | Colgrove et al. |
| 9,430,412 B2 | 8/2016 | Huang |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,501,245 B2 | 11/2016 | Hussain et al. |
| 9,513,820 B1 | 12/2016 | Shalev |
| 9,516,016 B2 | 12/2016 | Colgrove et al. |
| 9,552,248 B2 | 1/2017 | Miller et al. |
| 9,565,269 B2 | 2/2017 | Malwankar et al. |
| 9,632,870 B2 | 4/2017 | Bennett |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0140209 A1 | 7/2003 | Testardi |
| 2004/0049572 A1 | 3/2004 | Yamamoto et al. |
| 2005/0066095 A1 | 3/2005 | Mullick et al. |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0067585 A1 | 3/2007 | Ueda et al. |
| 2007/0109856 A1 | 5/2007 | Pellicone et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0034167 A1 | 2/2008 | Sharma et al. |
| 2008/0059699 A1 | 3/2008 | Kubo et al. |
| 2008/0065852 A1 | 3/2008 | Moore et al. |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0282045 A1 | 11/2008 | Biswas et al. |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | La Frese et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2011/0072300 A1 | 3/2011 | Rousseau |
| 2011/0121231 A1 | 6/2011 | Haas et al. |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0023375 A1 | 1/2012 | Dutta et al. |
| 2012/0036309 A1 | 2/2012 | Dillow et al. |
| 2012/0117029 A1 | 5/2012 | Gold |
| 2012/0198175 A1 | 8/2012 | Atkisson |
| 2012/0330954 A1 | 12/2012 | Sivasubramanian et al. |
| 2013/0018854 A1 | 1/2013 | Condict |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0201169 A1 | 7/2014 | Liu et al. |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2015/0019798 A1 | 1/2015 | Huang |
| 2015/0234709 A1 | 8/2015 | Koarashi |
| 2015/0242515 A1 | 8/2015 | Czerkowicz et al. |

(56) References Cited

U.S. PATENT DOCUMENTS

| | | |
|---|---|---|
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |
| 2017/0024142 A1 | 1/2017 | Watanabe et al. |
| 2017/0024166 A1 | 1/2017 | Singh et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.

Ouyang, J. et al. (Mar. 1-5, 2014) "SDF: Software-Defined Flash for Web-Scale Internet Storage Systems", ASPLOS 2014, 14 pages.

Zhang, J. et al. (2016) "Application-Aware and Software-Defined SSD Scheme for Tencent Large-Scale Storage System" 2016 IEEE 22nd International Conference on Parallel and Distributed Systems, 482-490.

"Open-Channel Solid State Drives NVMe Specification" (Apr. 2016), 24 pages.

REDUCING DATA DISTRIBUTION INEFFICIENCIES

REFERENCE TO RELATED APPLICATION

This application is a continuation of U.S. application Ser. No. 15/339,302 filed Oct. 31, 2016, the contents of which are hereby incorporated by reference.

BACKGROUND

Storage systems, such as enterprise storage systems, may include a centralized or de-centralized repository for data that provides common data management, data protection, and data sharing functions, for example, through connections to computer systems.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
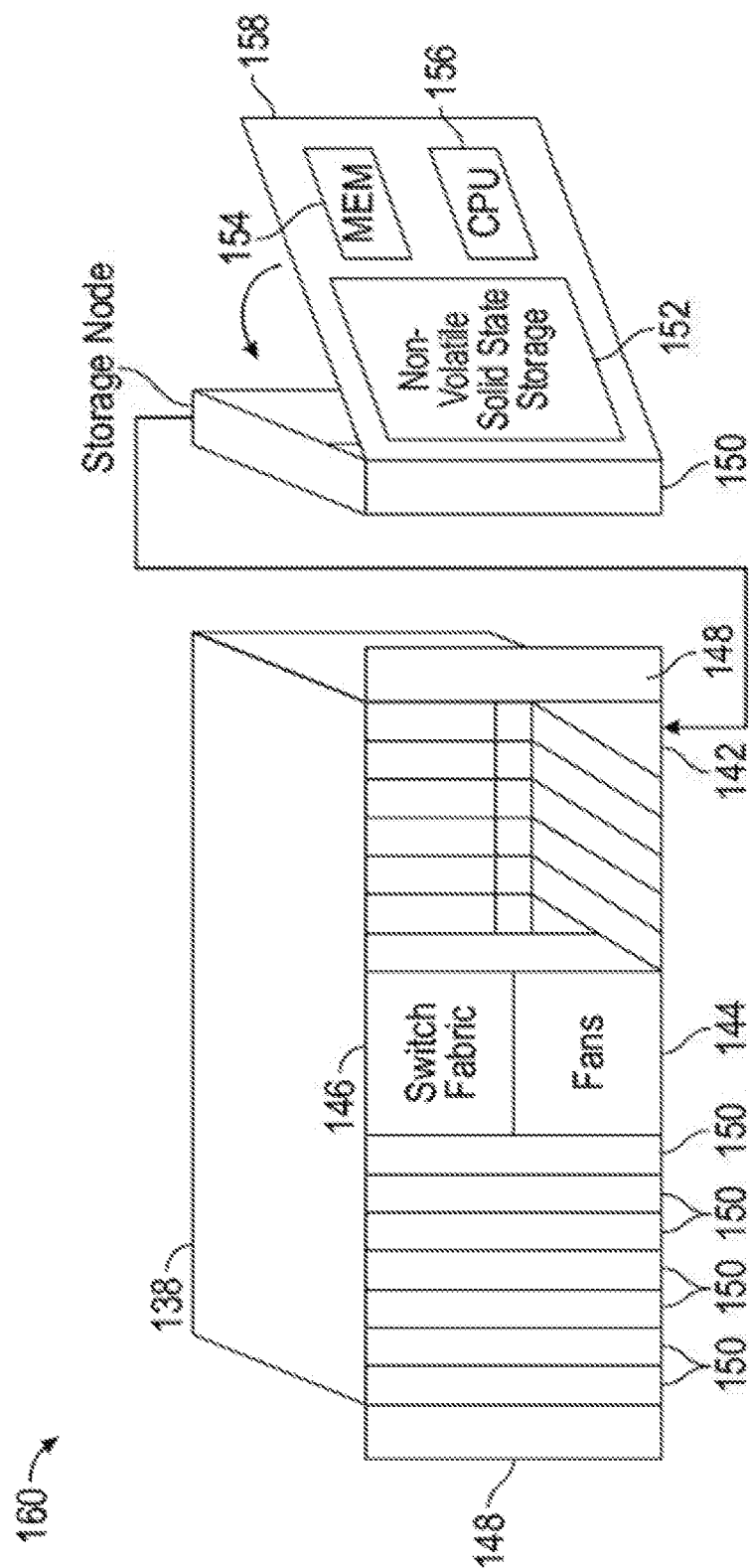
FIG. 1 illustrates a perspective view of a storage cluster, in accordance with some implementations.

Shared nothing systems are highly scalable, but may present challenges for data reduction across a cluster of machines. In one embodiment, a shared nothing system is a distributed comping architecture in which each node of the system is independent and self-sufficient, and there is not a single point of contention across the system. In one embodiment, shared nothing systems deterministically place data based upon content identifiers, data ranges, or a combination of the two. While this approach may evenly distribute the data across the nodes, it may place duplicate data on different nodes, which is inefficient. The operations described herein reduce this inefficiency by generating a hash of the newly written data and placing the data block on a node already containing similar data using the content-based hash.

Data deduplication (dedup) may be utilized to reduce the duplication of stored data, thus increasing the efficiency of the system. Data deduplication is a process to eliminate or remove redundant data to improve the utilization of storage resources. For example, during the data deduplication process, blocks of data may be processed and stored. When a subsequent block of data is received, the subsequent block of data may be compared with the previously stored block of data. If the subsequent block of data matches with the previously stored block of data, then the subsequent block of data may not be stored in the storage resource. Instead, a pointer to the previously stored block of data may replace the contents of the subsequent block of data.

In one embodiment, dedup operations prefer to operate on small block matches and node efficiency prefers large block placement. To satisfy these conditions, operations described herein compute rolling hashes that are sized around the minimum dedup match size. Of those hashes, a subset of them may be selected as a 'sketch' that represents the content of that data. Next, a variant of a CRUSH algorithm may be utilized with a subset of hashes from the sketch to create a list of candidate nodes, on which the data place be placed. CRUSH may determine the node(s) on which a given hash value is to be stored and provide a list of nodes to which a query may be sent. A query sketch may then be generated, which may be a subset of hash values from the sketch. Each of the candidate nodes may then determine which of the hashes in the query sketch it actually contains, and return this information to the node initiating the request. The new data may be placed at the node with the highest similarity score.

To implement such operations, the embodiments below describe a storage cluster that stores user data, such as user data originating from one or more user or client systems or other sources external to the storage cluster. The storage cluster distributes user data across storage nodes housed within a chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing inputs and outputs (I/O) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be a cluster node, a blade, a server, or other device.

The storage cluster is contained within a chassis, i.e., an enclosure housing one or more storage nodes. A system to provide power to each storage node, such as a power distribution bus, and a communication system, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), Server Message Block (SMB), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a chassis 138 having multiple slots 142. It should be appreciated that chassis 138 may be referred to as a housing, enclosure, or rack unit. In one embodiment, the chassis 138 has fifteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 1, storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of any number of non-volatile solid state storage units 152 or storage nodes 150 within the chassis.

Figure 2:
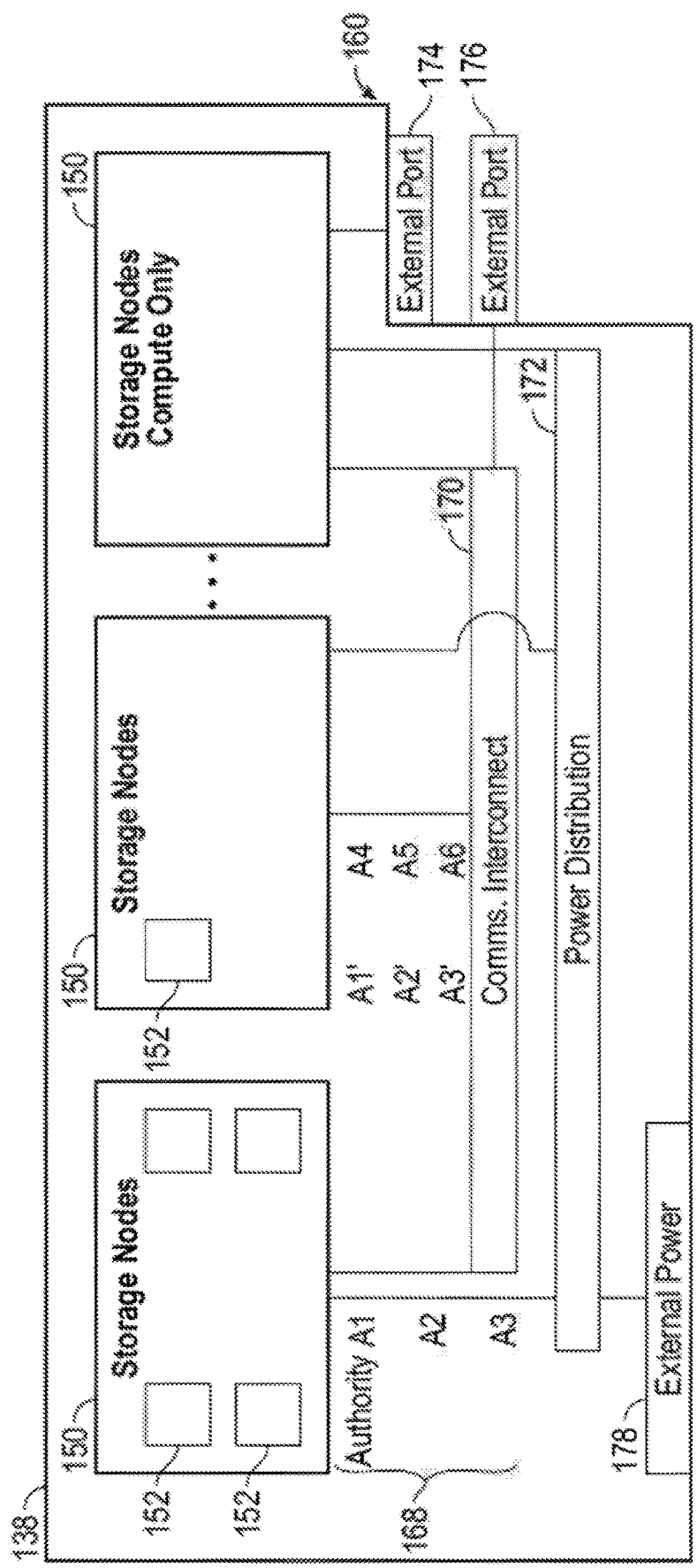
FIG. 2 illustrates a block diagram showing a communications interconnect and power distribution bus coupling multiple storage nodes, in accordance with some implementations.

FIG. 2 is a block diagram showing a communications interconnect 170 and power distribution bus 172 coupling multiple storage nodes 150. Referring back to FIG. 1, the communications interconnect 170 can be included in or implemented with the switch fabric 146 in some embodiments. Where multiple storage clusters 160 occupy a rack, the communications interconnect 170 can be included in or implemented with a top of rack switch, in some embodiments. As illustrated in FIG. 2, storage cluster 160 is enclosed within a single chassis 138. External port 176 is coupled to storage nodes 150 through communications interconnect 170, while external port 174 is coupled directly to a storage node. External power port 178 is coupled to power distribution bus 172. Storage nodes 150 may include varying amounts and differing capacities of non-volatile solid state storage 152 as described with reference to FIG. 1. In addition, one or more storage nodes 150 may be a compute only storage node as illustrated in FIG. 2. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 1 and 2, two of the tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIG. 5) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication (dedup) or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

Distributed transactions are persistently committed prior to being acknowledged. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 3:
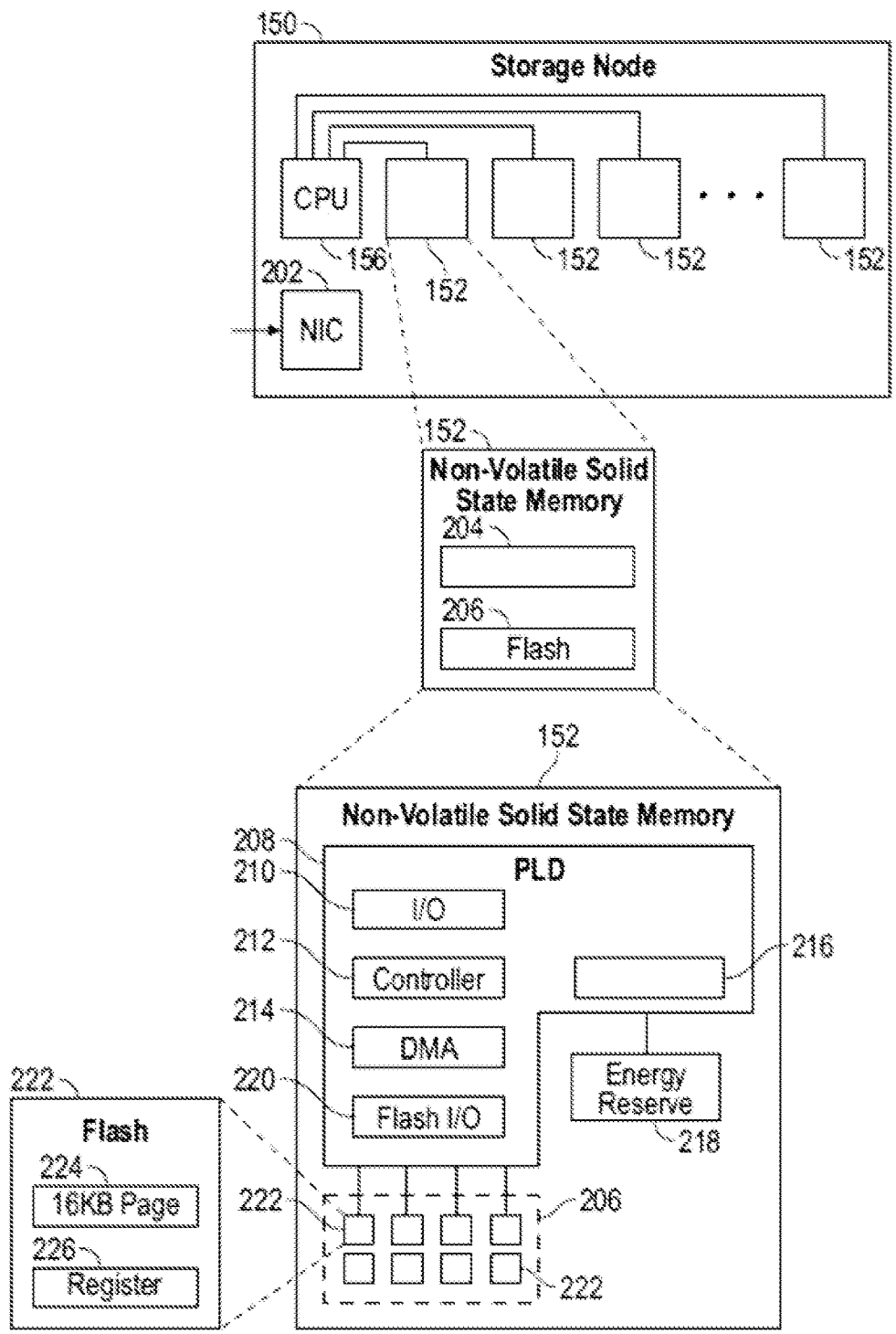
FIG. 3 illustrates contents of a storage node and contents of a non-volatile solid state storage of a storage node, in accordance with some implementations.

FIG. 3 is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 3, each non-volatile solid state storage 152 has a relatively fast non-volatile solid state memory, such as nonvolatile random access memory (NVRAM) 204, and flash memory 206. In some embodiments, NVRAM 204 may be a component that does not require programerase cycles (DRAM, MRAM, PCM), and can be a memory that can support being written vastly more often than the memory is read from. Moving down another level in FIG. 3, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 160, in various embodiments as disclosed herein, can be contrasted with storage arrays in general. The storage nodes 150 are part of a collection that creates the storage cluster 160. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 160, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 4:
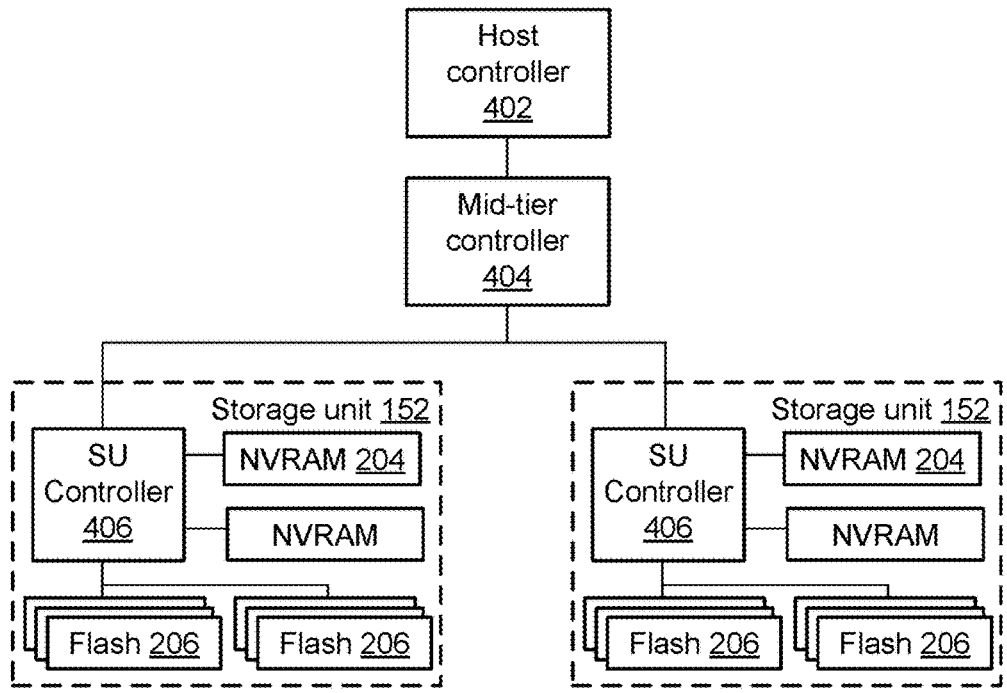
FIG. 4 illustrates a storage server environment, in accordance with some implementations.

FIG. 4 shows a storage server environment, which uses embodiments of the storage nodes 150 and storage units 152 of FIGS. 1-3. In this version, each storage unit 152 has a processor such as controller 212 (see FIG. 3), an FPGA (field programmable gate array), flash memory 206, and NVRAM 204 (which is super-capacitor backed DRAM 216, see FIGS. 2 and 3) on a PCIe (peripheral component interconnect express) board in a chassis 138 (see FIG. 1). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool region). Space within the NVRAM 204 spools is managed by each authority 512 independently. Each device provides an amount of storage space to each authority 512. That authority 512 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 512. This distribution of logical control is shown in FIG. 4 as a host controller 402, mid-tier controller 404 and storage unit controller(s) 406. Management of the control plane and the storage plane are treated independently, although parts may be physically co-located on the same blade. Each authority 512 effectively serves as an independent controller. Each authority 512 provides its own data and metadata structures, its own background workers, and maintains its own lifecycle.

Figure 5:
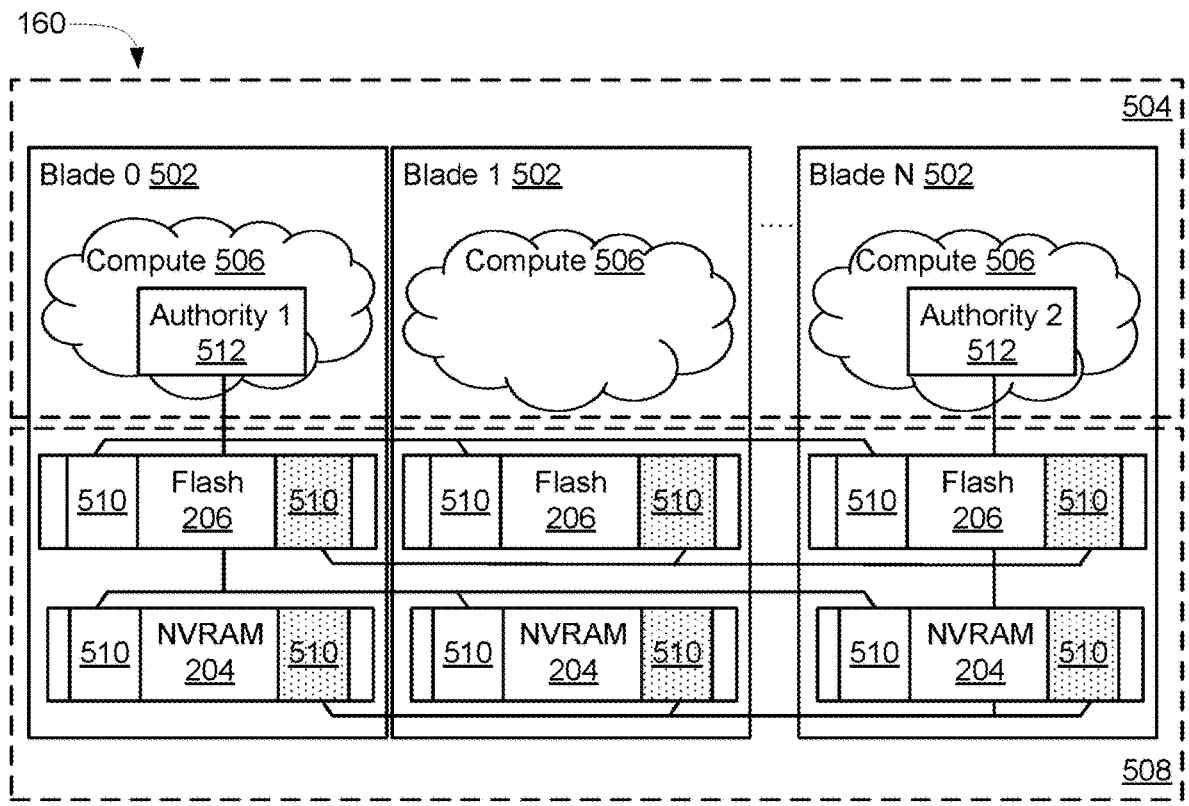
FIG. 5 illustrates blade hardware, in accordance with some implementations.

FIG. 5 is a blade 502 hardware block diagram, showing a control plane 504, compute and storage planes 506, 508, and authorities 512 interacting with underlying physical resources, using embodiments of the storage nodes 150 and storage units 152 of FIGS. 1-3 in the storage server environment of FIG. 4. The control plane 504 is partitioned into a number of authorities 512 which can use the compute resources in the compute plane 506 to run on any of the blades 502. The storage plane 508 is partitioned into a set of devices, each of which provides access to flash 206 and NVRAM 204 resources.

In the compute and storage planes 506, 508 of FIG. 5, the authorities 512 interact with the underlying physical resources (i.e., devices). From the point of view of an authority 512, its resources are striped over all of the physical devices. From the point of view of a device, it provides resources to all authorities 512, irrespective of where the authorities happen to run. In order to communicate and represent the ownership of an authority 402, including the right to record persistent changes on behalf of that authority 402, the authority 402 provides some evidence of authority ownership that can be independently verifiable. A token 406 is employed for this purpose and function in one embodiment.

Each authority 512 has allocated or has been allocated one or more partitions 510 of storage memory in the storage units 152, e.g. partitions 510 in flash memory 206 and NVRAM 204. Each authority 512 uses those allocated partitions 510 that belong to it, for writing or reading user data. Authorities can be associated with differing amounts of physical storage of the system. For example, one authority 512 could have a larger number of partitions 510 or larger sized partitions 510 in one or more storage units 152 than one or more other authorities 512.

Figure 6:
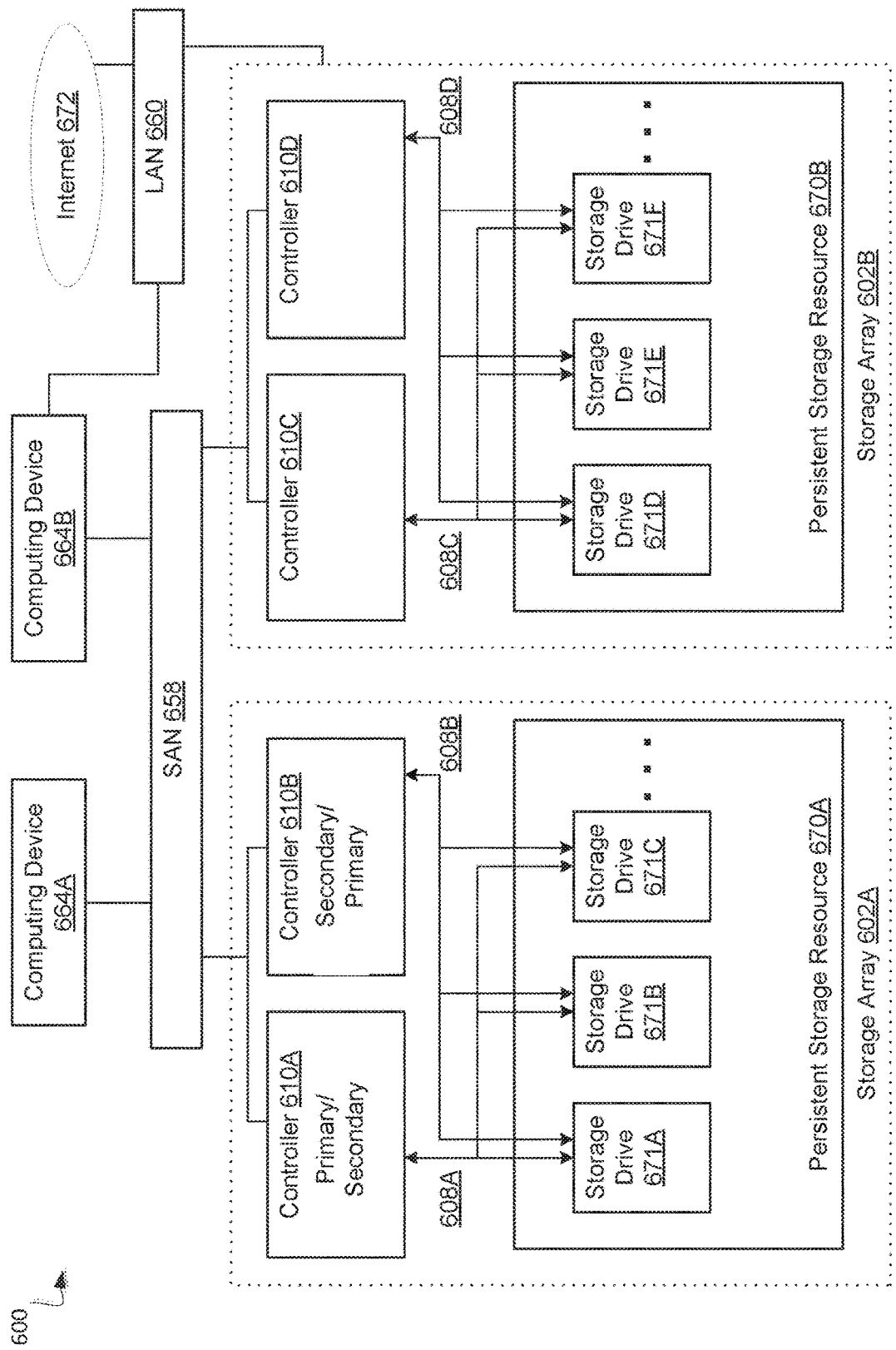
FIG. 6 illustrates an example system for data storage, in accordance with some implementations.

FIG. 6 illustrates an example system for data storage, in accordance with some implementations. System 600 (also referred to as "storage system" herein) includes numerous elements for purposes of illustration rather than limitation. It may be noted that system 600 may include the same, more, or fewer elements configured in the same or different manner in other implementations.

System 600 includes a number of computing devices 664. Computing devices may be for example, a server in a data center, a workstation, a personal computer, a notebook, or the like. Computing devices 664 are coupled for data communications to one or more storage arrays 602 through a storage area network (SAN) 658 or a local area network (LAN) 660.

The SAN 658 may be implemented with a variety of data communications fabrics, devices, and protocols. For example, the fabrics for SAN 658 may include Fibre Channel, Ethernet, Infiniband, Serial Attached Small Computer System Interface (SAS), or the like. Data communications protocols for use with SAN 658 may include Advanced Technology Attachment (ATA), Fibre Channel Protocol, Small Computer System Interface (SCSI), Internet Small Computer System Interface (iSCSI), HyperSCSI, Non-Volatile Memory Express (NVMe) over Fabrics, or the like. It may be noted that SAN 658 is provided for illustration, rather than limitation. Other data communication couplings may be implemented between computing devices 664 and storage arrays 602.

The LAN 660 may also be implemented with a variety of fabrics, devices, and protocols. For example, the fabrics for LAN 660 may include Ethernet (802.3), wireless (802.11), or the like. Data communication protocols for use in LAN 660 may include Transmission Control Protocol (TCP), User Datagram Protocol (UDP), Internet Protocol (IP), HyperText Transfer Protocol (HTTP), Wireless Access Protocol (WAP), Handheld Device Transport Protocol (HDTP), Session Initiation Protocol (SIP), Real Time Protocol (RTP), or the like.

Storage arrays 602 may provide persistent data storage for the computing devices 664. Storage array 602A may be contained in a chassis (not shown), and storage array 602B may be contained in another chassis (not shown), in implementations. Storage array 602A and 602B may include one or more storage array controllers 610 (also referred to as "controller" herein). A storage array controller 610 may be embodied as a module of automated computing machinery comprising computer hardware, computer software, or a combination of computer hardware and software. In some implementations, the storage array controllers 610 may be configured to carry out various storage tasks. Storage tasks may include writing data received from the computing devices 664 to storage array 602, erasing data from storage array 602, retrieving data from storage array 602 and providing data to computing devices 664, monitoring and reporting of disk utilization and performance, performing redundancy operations, such as Redundant Array of Independent Drives (RAID) or RAID-like data redundancy operations, compressing data, encrypting data, and so forth.

Storage array controller 610 may be implemented in a variety of ways, including as a Field Programmable Gate Array (FPGA), a Programmable Logic Chip (PLC), an Application Specific Integrated Circuit (ASIC), System-on-Chip (SOC), or any computing device that includes discrete components such as a processing device, central processing unit, computer memory, or various adapters. Storage array controller 610 may include, for example, a data communications adapter configured to support communications via the SAN 658 or LAN 660. In some implementations, storage array controller 610 may be independently coupled to the LAN 660. In implementations, storage array controller 610 may include an I/O controller or the like that couples the storage array controller 610 for data communications, through a midplane (not shown), to a persistent storage resource 670 (also referred to as a "storage resource" herein). The persistent storage resource 670 main include any number of storage drives 671 (also referred to as "storage devices" herein) and any number of non-volatile Random Access Memory (NVRAM) devices (not shown).

In some implementations, the NVRAM devices of a persistent storage resource 670 may be configured to receive, from the storage array controller 610, data to be stored in the storage drives 671. In some examples, the data may originate from computing devices 664. In some examples, writing data to the NVRAM device may be carried out more quickly than directly writing data to the storage drive 671. In implementations, the storage array controller 610 may be configured to utilize the NVRAM devices as a quickly accessible buffer for data destined to be written to the storage drives 671. Latency for write requests using NVRAM devices as a buffer may be improved relative to a system in which a storage array controller 610 writes data directly to the storage drives 671. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 671.

In implementations, storage drive 671 may refer to any device configured to record data persistently, where "persistently" or "persistent" refers as to a device's ability to maintain recorded data after loss of power. In some implementations, storage drive 671 may correspond to non-disk storage media. For example, the storage drive 671 may be one or more solid-state drives (SSDs), flash memory based storage, any type of solid-state non-volatile memory, or any other type of non-mechanical storage device. In other implementations, storage drive 671 may include mechanical or spinning hard disk, such as hard-disk drives (HDD).

In some implementations, the storage array controllers 610 may be configured for offloading device management responsibilities from storage drive 671 in storage array 602. Storage drive management responsibilities may include, for example, an operation that is typically performed by the storage drive 671 (e.g., the controller (not shown) associated with a particular storage drive 671). For example, storage array controllers 610 may perform the operations related to deduplication aware scalable content placement, as described herein. In one embodiment, a storage array controller may receive data to be stored in the storage array 602 and calculate a plurality of hashes corresponding to the data to be stored by utilizing a rolling hash algorithm on the data to be stored. A storage array controller may further determine a first representative subset of the plurality of hashes corresponding to the data to be stored and a second subset of the plurality of hashes of the first subset, and generate, in view of the second subset, a candidate placement list. In one embodiment the candidate placement list includes less than all of the plurality of solid state drives. In another embodiment, the candidate placement list may include all each drive of the plurality of solid state drives.

The storage controller may send the first subset of the plurality of hashes to one or more solid state drives (e.g., drive 671) represented on the candidate placement list. In response the storage array controller may receive, from the one or more solid state drives represented on the candidate placement list, characteristics corresponding to the one or more solid state drives represented on the candidate placement list. In one embodiment the characteristics may include a matching score, the matching score indicating how well the first subset of the plurality of hashes matches data stored on the one or more solid state drives represented on the candidate list. In one embodiment, the first subset of hashes may be compared to hashes representing the data stored on the solid state drives to determine the matching score. In another embodiment, the first subset may be directly compared to the data itself to determine the matching score.

The characteristics received by the storage controller may include a capacity score or a load score, associated with a corresponding one of the one or more solid state drives represented on the candidate placement list. In view of the characteristics, the storage controller may identify one of the one or more solid state drives represented on the candidate placement list and send the data to the identified solid state drive. For example, data may be sent to the drive which best matches the data to be sent, while having enough capacity to store the data.

In one embodiment, each drive of the storage drives on the candidate list sends its own corresponding characteristics. In this case, a storage controller receives characteristics from a drive, and determines to send data to that drive based on its characteristics. In an alternative embodiment, a storage controller may receive characteristics from a drive not corresponding to the received characteristics, and the storage controller may determine to send data to the drive corresponding to the received characteristics, which is not the same drive from which the characteristics were received.

In implementations, storage array 602 may implement two or more storage array controllers 610. For example, storage array 602A may include storage array controllers 610A and storage array controllers 610B. At a given instance, a single storage array controller 610 (e.g., storage array controller 610A) of a storage system 600 may be designated with primary status (also referred to as "primary controller" herein), and other storage array controllers 610 (e.g., storage array controller 610A) may be designated with secondary status (also referred to as "secondary controller" herein). The primary controller may have particular rights, such as permission to alter data in persistent storage resource 670 (e.g., writing data to persistent storage resource 670). At least some of the rights of the primary controller may supersede the rights of the secondary controller. For instance, the secondary controller may not have permission to alter data in persistent storage resource 670 when the primary controller has the right. The status of storage array controllers 610 may change. For example, storage array controller 610A may be designated with secondary status, and storage array controller 610B may be designated with primary status.

In some implementations, a primary controller, such as storage array controller 610A, may serve as the primary controller for one or more storage arrays 602, and a second controller, such as storage array controller 610B, may serve as the secondary controller for the one or more storage arrays 602. For example, storage array controller 610A may be the primary controller for storage array 602A and storage array 602B, and storage array controller 610B may be the secondary controller for storage array 602A and 602B. In some implementations, storage array controllers 610C and 610D (also referred to as "storage processing modules") may neither have primary or secondary status. Storage array controllers 610C and 610D, implemented as storage processing modules, may act as a communication interface between the primary and secondary controllers (e.g., storage array controllers 610A and 610B, respectively) and storage array 602B. For example, storage array controller 610A of storage array 602A may send a write request, via SAN 658, to storage array 602B. The write request may be received by both storage array controllers 610C and 610D of storage array 602B. Storage array controllers 610C and 610D facilitate the communication, e.g., send the write request to the appropriate storage drive 671. It may be noted that in some implementations storage processing modules may be used to increase the number of storage drives controlled by the primary and secondary controllers.

In implementations, storage array controllers 610 are communicatively coupled, via a midplane (not shown), to one or more storage drives 671 and to one or more NVRAM devices (not shown) that are included as part of a storage array 602. The storage array controllers 610 may be coupled to the midplane via one or more data communications links and the midplane may be coupled to the storage drives 671 and the NVRAM devices via one or more data communications links. The data communications links described above are collectively illustrated by data communications links 608 and may include a Peripheral Component Interconnect Express (PCIe) bus, for example.

Figure 7:
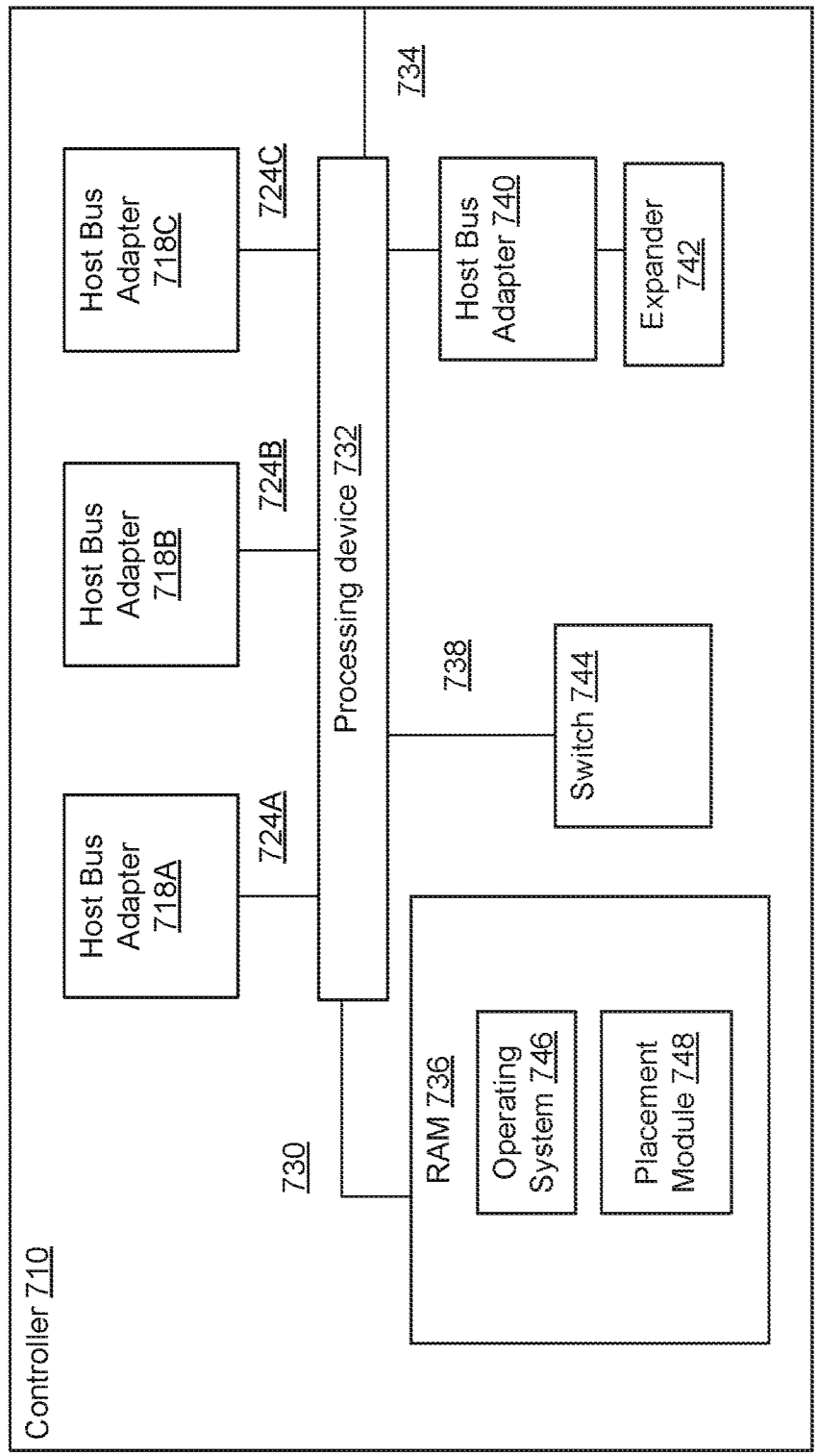
FIG. 7 illustrates an example system for data storage, in accordance with some implementations.

FIG. 7 illustrates an example system for data storage, in accordance with some implementations. Storage array controller 710 illustrated in FIG. 7 may be similar to the storage array controllers 610 described with respect to FIG. 6. In one example, storage array controller 710 may be similar to storage array controller 610A or storage array controller 610B. Storage array controller 710 includes numerous elements for purposes of illustration rather than limitation. It may be noted that storage array controller 710 may include the same, more, or fewer elements configured in the same or different manner in other implementations. It may be noted that elements of FIG. 6 may be included below to help illustrate features of storage array controller 710.

Storage array controller 710 may include one or more processing devices 732 and random access memory (RAM) 736. Processing device 732 (or controller 710) represents one or more general-purpose processing devices such as a microprocessor, central processing unit, or the like. More particularly, the processing device 732 (or controller 710) may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 732 (or controller 710) may also be one or more special-purpose processing devices such as an application specific integrated circuit (ASIC), a field programmable gate array (FPGA), a digital signal processor (DSP), network processor, or the like.

The processing device 732 may be connected to the RAM 736 via a data communications link 730, which may be embodied as a high speed memory bus such as a Double-Data Rate 4 (DDR4) bus. Stored in RAM 736 is an operating system 746. In some implementations, a placement module 748 is stored in RAM 736. Placement module 748 may include computer program instructions for performing deduplication aware scalable content placement. The placement module 748 may be configured to perform steps such as receiving data to be stored on one or more nodes of a storage array and calculating a plurality of hashes corresponding to the data. Placement module 748 may further determine a first subset of the plurality of hashes, determine a second subset of the plurality of hashes of the first subset, and generate a node candidate placement list. Placement module 748 may further send the first subset to one or more nodes represented on the node candidate placement list and receive, from the nodes represented on the node candidate placement list, characteristics corresponding to the nodes represented on the candidate placement list. Placement module 748 may further identify one of the one or more nodes represented on the candidate placement list in view of the characteristic and sending the data to the identified node. These and other steps are described in greater detail below with respect to FIG. 8.

It may be noted that the placement module 748 and the operating system 746 shown in RAM 736 for purposes of illustration, rather than limitation. Many components of placement module 748 or the operating system 746 may also be stored in non-volatile memory such as, for example, persistent storage resource 670 described with respect to FIG. 6.

In implementations, storage array controller 710 includes one or more host bus adapters 718 that are coupled to the processing device 732 via a data communications link 724. In implementations, host bus adapters 718 may be computer hardware that connects a host system (e.g., the storage array controller) to other network and storage arrays. In some examples, host bus adapters 718 may be a Fibre Channel adapter that enables the storage array controller 710 to connect to a SAN, an Ethernet adapter that enables the storage array controller 710 to connect to a LAN, or the like. Host bus adapters 718 may be coupled to the processing device 732 via a data communications link 724 such as, for example, a PCIe bus.

In implementations, storage array controller 710 may include a host bus adapter 740 that is coupled to an expander 742. The expander 742 may be used to attach a host system to a larger number of storage drives. The expander 742 may, for example, be a SAS expander utilized to enable the host bus adapter 740 to attach to storage drives in an implementation where the host bus adapter 740 is embodied as a SAS controller.

In implementations, storage array controller 710 may include a switch 744 coupled to the processing device 732 via a data communications link 738. The switch 744 may be a computer hardware device that can create multiple endpoints out of a single endpoint, thereby enabling multiple devices to share a single endpoint. The switch 744 may, for example, be a PCIe switch that is coupled to a PCIe bus (e.g., data communications link 738) and presents multiple PCIe connection points to the midplane.

In implementations, storage array controller 710 includes a data communications link 734 for coupling the storage array controller 710 to other storage array controllers. In some examples, data communications link 734 may be a QuickPath Interconnect (QPI) interconnect.

Figure 8:
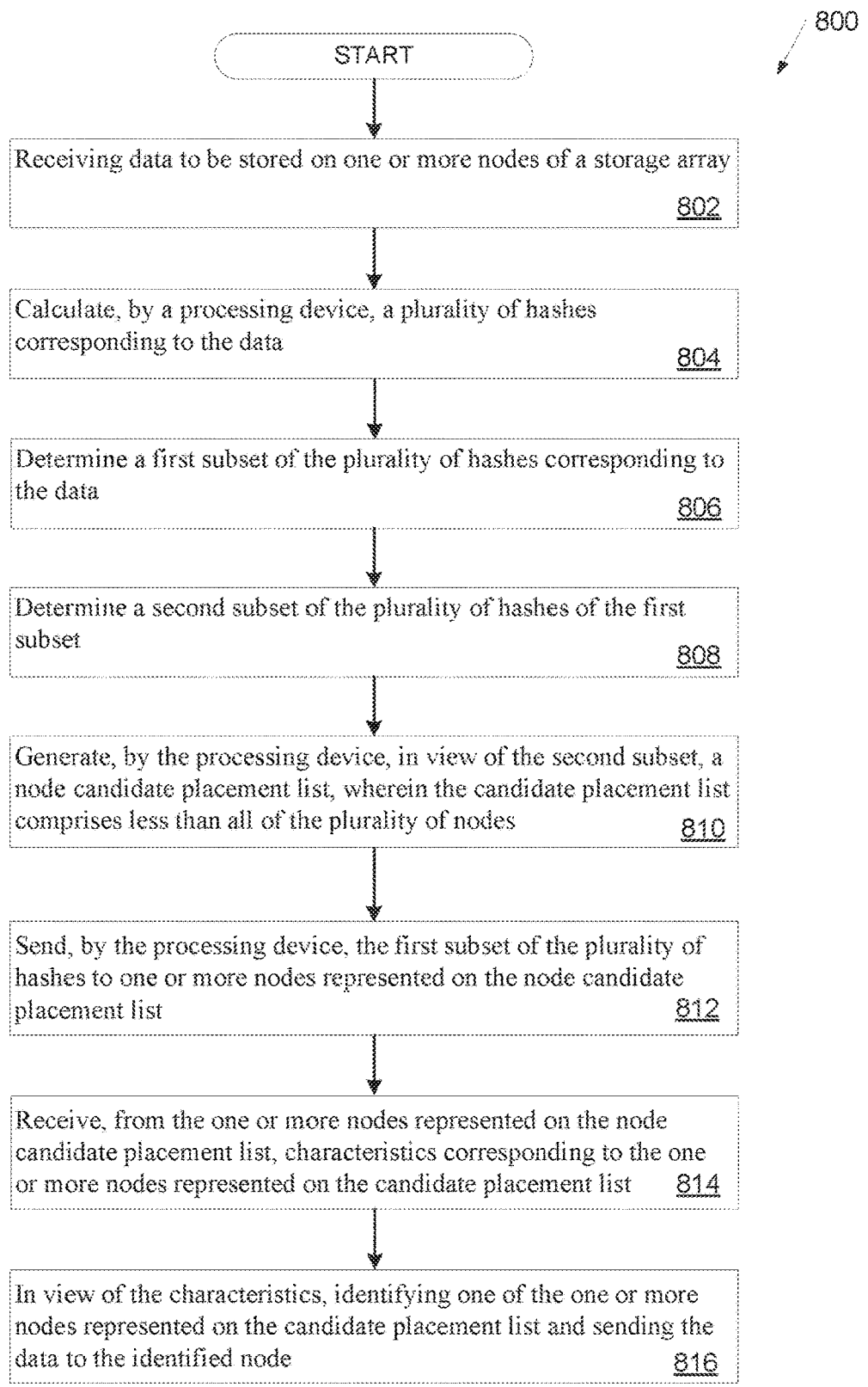
FIG. 8 is a flow diagram illustrating deduplication aware scalable content placement, in accordance with some implementations.

FIG. 8 is a flow diagram illustrating deduplication aware scalable content placement, in accordance with some implementations. In one embodiment, Method 800 may be performed by processing logic that includes hardware (e.g., circuitry, dedicated logic, programmable logic, microcode), software (e.g., instructions run on a processing device to perform hardware simulation), or a combination thereof. In one implementation, some or all the operations of deduplication aware scalable content placement may be performed by placement module 748 as described herein.

At block 802, processing logic receives data to be stored on one or more nodes of a storage array. At block 804 processing logic calculates, by a processing device, a plurality of hashes corresponding to the data. In one embodiment, processing logic utilizes a rolling hash algorithm to calculate rolling hashes of the data. In one embodiment, to calculate the rolling hashes, the data may be divided into chucks of a defined size (e.g., Cs). Processing logic may compute a rolling hash of size Hs (where Hs<=Cs) and output a hash every Hb bytes (e.g., 512 bytes). In another embodiment, processing logic may output a hash every byte (or smaller).

Processing logic may, at block 806, determine a first subset of the plurality of hashes corresponding to the data. In one embodiment, the first subset of the plurality of hashes represents a sketch (e.g., a fingerprint) of the data. The sketch may uniquely identify the data it represents. In one embodiment, processing logic determines the sketch by selecting a defined number (Ns) of fingerprints (e.g., hashes). In one embodiment, processing logic may select the largest Ns fingerprints, the smallest Ns fingerprints, or some other combination. In one embodiment, processing logic may select hashes by the low order k bits (e.g., k=24). Advantageously, the high order bits would then still be randomly distributed throughout the range, allowing processing logic to efficiently use index summary levels.

As data blocks are received by a data deduplication system, data stored in volatile memory (e.g., cache memory) may be used to help accelerate the detection of received data blocks that are already stored in the persistent storage resource. For instance, rather than comparing a hash value of a received data block to all the hash values in a data deduplication system, where the hash values in a data deduplication system represent data blocks already stored in the persistent storage resource, a data deduplication system may implement index-like and table-like data structures to improve efficiency. For example, a data deduplication system may implement index summary levels and deduplication map levels, for groups of stored hash values and location pointers that were generated at roughly similar points in time or from some similar natural grouping, that are stored in volatile memory or a persistent storage resource and that may be used to efficiently determine if the received data block is currently stored in the persistent storage resource without comparing a hash value of a received data block to all the hash values in a data deduplication system.

Processing logic may, at block 808, determine a second subset (Nn) of the plurality of hashes of the first subset. In one embodiment, the second subset is smaller than the first subset (e.g., Ns<Nn). In another embodiment, the second subset may be equal to the first subset. The second subset may be determined based on the same criteria according to which the first subset was determined. For example, if the first subset is the largest Ns fingerprints of the rolling hashes, the second subset may also be the largest Nn fingerprints of the first subset.

At block 810, processing logic generates, by the processing device, in view of the second subset, a node candidate placement list. The candidate placement list may include nodes that are eligible to store the data. In one embodiment, the candidate placement list includes less than all of the plurality of nodes (e.g., indicating that not all nodes queried are acceptable storage destinations for the data). To generate the candidate placement list, processing logic may place the Nn fingerprints into a CRUSH algorithm. In one embodiment, the CRUSH determines the node(s) on which a given hash value is to be stored and provides a list of nodes to which an individual query may be sent. In one embodiment, data is to be stored on nodes that already contain the same or related data. In one embodiment, if a node's capacity is overloaded the CRUSH algorithm may not add the node to the list.

At block 812, processing logic sends, by the processing device, the first subset (e.g., a query sketch) of the plurality of hashes to one or more nodes represented on the node candidate placement list. At block 814, processing logic receives, from the one or more nodes represented on the node candidate placement list, characteristics corresponding to the one or more nodes represented on the candidate placement list. In one embodiment, to determine the characteristics, each of the candidate nodes looks to see which of the hashes in the query sketch it actually contains, and returns this information to the node initiating the request. Characteristics may also include the available capacity and/or throughput of a corresponding node.

At block 816, in view of the characteristics, processing logic identifies one of the one or more nodes represented on the candidate placement list and sends the data to the identified node. In one embodiment, the data to be stored may be placed at the node with the highest similarity score. The similarity score could be computed in a number of ways. For example, processing logic could place the data on the node that contains the highest number of absolute matches. Alternatively or in combination, processing logic could scale the similarity by the amount of data already stored on the node, so that full nodes are less likely to get additional new data, thus promoting load balance. The new data may be sent to the designated node and deduped using the fine-grained shared nothing dedupe engine of that node. In one embodiment, a node returns its own characteristics and if selected, data is stored to that particular node. In another embodiment, nodes may return characteristics of other nodes. In this system, when a node is selected, it may not be the same node that sent the chosen characteristics.

Figure 9:
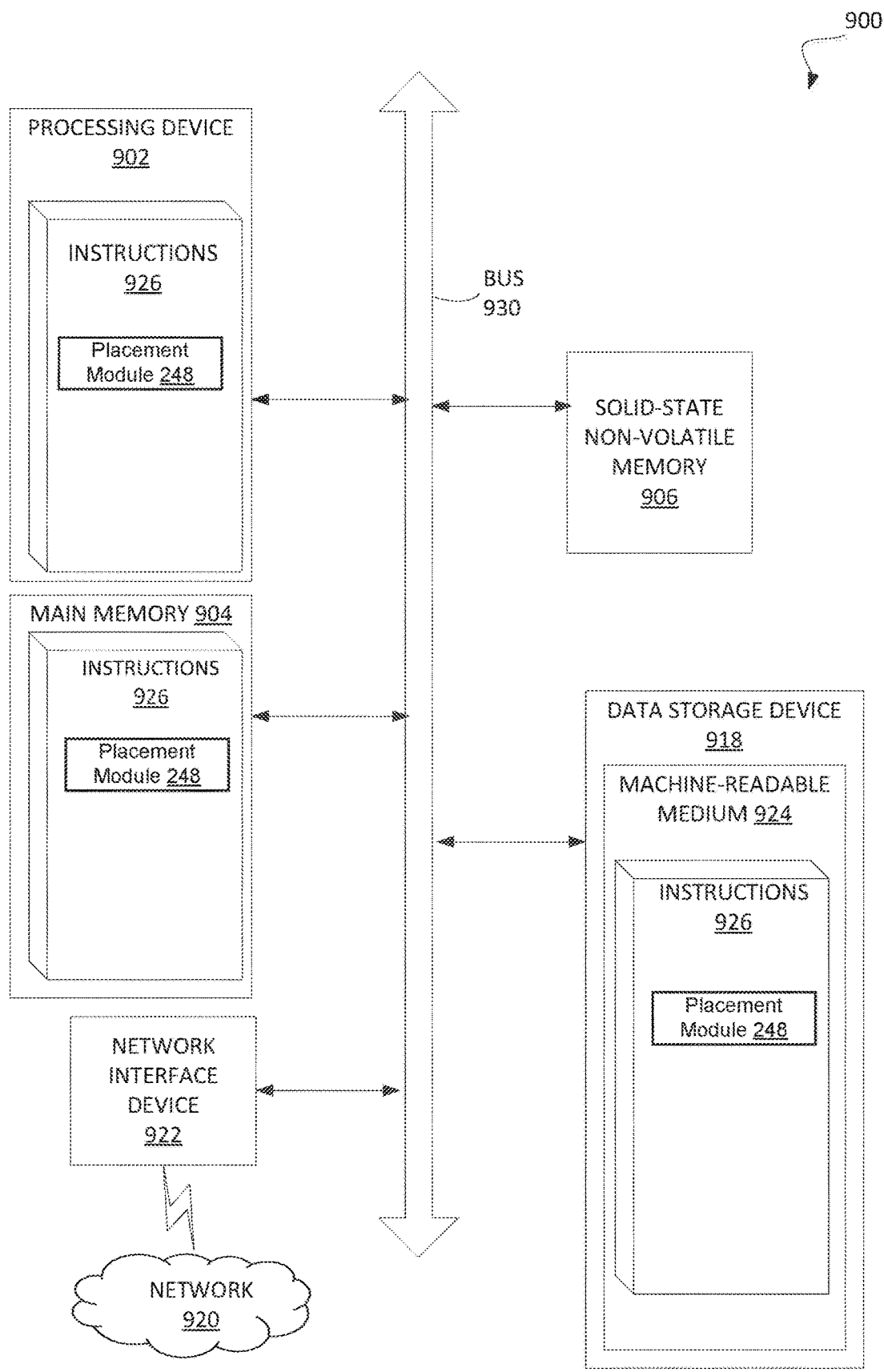
FIG. 9 illustrates an example computer system, in accordance with some implementations.

FIG. 9 depicts an example computer system 900 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, a storage system, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 900 includes a processing device 902, a main memory 904 (e.g., random access memory (RAM), read-only memory (ROM), flash memory, dynamic random access memory (DRAM) such as synchronous DRAM (SDRAM)), a solid-state non-volatile memory 906 (e.g., flash memory, 3D crosspoint (XPoint) memory, magnetoresistive random-access memory (MRAM), or any other such storage media that does not use a physical disk), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute a placement module 748 for performing any of operations and steps discussed herein. The computer system 900 may further include a network interface device 922. The data storage device 918 may include a computer-readable storage medium 924 on which is stored the placement module 748 embodying any one or more of the methodologies or functions described herein. The placement module 748 may also reside, completely or at least partially, within the main memory 904 and/or within the processing device 902 during execution thereof by the computer system 900, the main memory 904 and the processing device 902 also constituting computer-readable media. The placement module 748 may further be transmitted or received over a network via the network interface device 922.

While the computer-readable storage medium 924 is shown in the illustrative examples to be a single medium, the term "computer-readable storage medium" (e.g., "non-transitory computer-readable storage medium") may be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure may, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "performing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable storage medium having stored thereon instructions, which may be used to program a computer system (or other electronic devices) to perform a process according to the present disclosure. A machine-readable storage medium includes any method for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A system comprising:
   a storage array comprising a plurality of solid state drives; and a storage controller coupled to one of the plurality of solid state drives, the storage controller comprising a processing device, the processing device to:
   calculate a plurality of hashes corresponding to data to be stored on one or more nodes of a storage array utilizing a hash algorithm on the data to be stored;
   generate, based on the plurality of hashes, a candidate placement list for the data, wherein the candidate placement list comprises drives of the plurality of solid state drives having data similar to the data to be stored;
   identify, by the processing device, at least one of the plurality of solid state drives represented on the candidate placement list having data similar to the data to be stored based on drive characteristics being received from the at least one of the plurality of solid state drives represented on the candidate list: and
   send the data to the identified at least one of the plurality of solid state drives.

2. The system of claim 1, wherein the hash algorithm is a rolling hash algorithm.

3. The system of claim 1, wherein the characteristics comprise a matching score corresponding to:
   a first subset of the plurality of hashes corresponding to the data to be stored; and
   data stored on one of the one or more solid state drives represented on the candidate placement list.

4. The system of claim 3, wherein the characteristics further comprise at least one of a capacity score or a load score, associated with a corresponding one of the one or more solid state drives represented on the candidate placement list.

5. The system of claim 3, wherein the processing device is to determine the first subset in view of a predetermined number of low order bits corresponding to the plurality of hashes.

6. A method comprising:
   calculating a plurality of hashes corresponding to data to be stored on one or more nodes of a storage array utilizing a hash algorithm on the data to be stored;
   generating, based on the plurality of hashes, a candidate placement list for the data, wherein the candidate placement list comprises nodes having data similar to the data to be stored;
   identifying, by a processing device, one of the one or more nodes represented on the candidate placement list having data, similar to the data to be stored based on node characteristics being received from the one or more nodes represented on the candidate placement list: and
   sending the data to the identified node.

7. The method of claim 6, wherein the nodes of the storage array are solid state drives.

8. The method of claim 6, wherein to calculate the plurality of hashes corresponding to the data, the method further comprises utilizing a rolling hash algorithm on the data.

9. The method of claim 6, the method further comprising:
   sending the data to a second node responsive to receiving the characteristics from a first solid state drive represented on the candidate placement list, wherein the characteristics correspond to the second node.

10. The method of claim 6, wherein the characteristics comprise a matching score corresponding to:
    a first subset of the plurality of hashes corresponding to the data to be stored and data stored on one of the one or more nodes represented on the candidate placement list.

11. The method of claim 10, wherein the characteristics further comprise at least one of a capacity score or a load score, associated with a corresponding one of the one or more nodes represented on the candidate placement list.

12. The method of claim 10, further comprising determining the first subset in view of a predetermined number of low order bits corresponding to the plurality of hashes.

13. A non-transitory computer readable storage medium storing instructions, which when executed, cause a processing device to:

calculate a plurality of hashes corresponding to data to be stored on one or more nodes of a storage array utilizing a hash algorithm on the data to be stored;

generate, based on the plurality of hashes, a candidate placement list for the data, wherein the candidate placement list comprises nodes having data similar to the data to be stored;

identify, by the processing device, one of the one or more nodes represented on the candidate placement list having data similar to the data to be stored based on a node characteristic being received from one of the one or more nodes represented on the candidate placement list: and send the data to the identified node.

14. The non-transitory computer readable storage medium of claim 13, wherein the nodes of the storage array are solid state drives.

15. The non-transitory computer readable storage medium of claim 13, wherein to determine the plurality of hashes corresponding to the data, the processing device is to compute a rolling hash of the data.

16. The non-transitory computer readable storage medium of claim 13, wherein the characteristics comprise a matching score corresponding to:

a first subset of the plurality of hashes corresponding to the data to be stored and data stored on one of the one or more nodes represented on the candidate placement list.

17. The non-transitory computer readable storage medium of claim 16, further comprising determining the first subset in view of a predetermined number of low order bits corresponding to the plurality of hashes.

* * * * *